United States Patent

Vareille et al.

[11] Patent Number: 6,156,371
[45] Date of Patent: Dec. 5, 2000

[54] PROCESS FOR PREPARING CARAMELIZED COCOA NIBS AND PRODUCT THEREOF

[75] Inventors: Philippe Vareille, Jongny; Faycal Idriss, Bulle, both of Switzerland

[73] Assignee: Nestec S.A., Vevey, Switzerland

[21] Appl. No.: 09/125,669

[22] PCT Filed: Mar. 8, 1997

[86] PCT No.: PCT/EP97/01210

§ 371 Date: Aug. 20, 1998

§ 102(e) Date: Aug. 20, 1998

[87] PCT Pub. No.: WO97/33483

PCT Pub. Date: Sep. 18, 1997

[30] Foreign Application Priority Data

Mar. 11, 1996 [EP] European Pat. Off. .............. 96200657

[51] Int. Cl.[7] ...................................... A23G 1/02
[52] U.S. Cl. .......................... 426/631; 426/520; 426/639; 426/659; 426/660
[58] Field of Search ..................................... 426/631, 639, 426/659, 660, 520

[56] References Cited

U.S. PATENT DOCUMENTS 2,064,524 12/1936 Diefenbach .............................. 426/631
4,423,085 12/1983 Chen et al. .
5,013,575 5/1991 Stadler et al. .......................... 426/639

FOREIGN PATENT DOCUMENTS

| 898 861 | 5/1945 | France . |
| 1 364 889 | 5/1964 | France . |
| 1 369 375 | 7/1964 | France . |
| 2 515 485 | 5/1983 | France . |
| 545 361 | 10/1992 | France . |
| 22 39 928 | 2/1974 | Germany . |
| 23 24 343 | 12/1974 | Germany . |
| 5 37 02 532 | 7/1988 | Germany . |
| 1-034247 | 2/1989 | Japan . |
| 2 065 442 | 7/1981 | United Kingdom . |

OTHER PUBLICATIONS

Minifie, B, "Chocolate, Cocoa and Confectionery," 2nd Ed. Avi Publishing Co., Westport, Connecticut, p. 145–149, 1980.

Primary Examiner—Helen Pratt
Attorney, Agent, or Firm—Pennie & Edmonds LLP

[57] ABSTRACT

Process for the preparation of cocoa nibs coated with caramelized crystalline sugar, in which a mixture containing at least cocoa nibs pieces, sugar, and water and/or milk is prepared, the mixture being treated at a high temperature so as to obtain caramelized cocoa nibs, which are then tempered and heat treated. Also, the caramelized cocoa nibs obtainable by this process and their use in food products.

17 Claims, No Drawings

PROCESS FOR PREPARING CARAMELIZED COCOA NIBS AND PRODUCT THEREOF

TECHNICAL FIELD

The subject of the present invention is caramelized cocoa nibs, a process for preparing these caramelized cocoa nibs and a process for using these caramelized cocoa nibs in the food sector.

BACKGROUND ART

It is known to coat, especially by spraying, almonds with a sugar-containing mixture.

Thus, DE 2239928 describes pralines which do not stick. The document describes the coating of almonds by spraying with a syrup containing cinnamon, cocoa, vanilla and vanilla sugar and then their glazing with the aid of a preparation containing especially gum arabic, so as to avoid their sticking together.

So far, no process is known for the preparation of caramelized cocoa nibs. Now, it would be very useful to be able to use caramelized cocoa nibs in the food sector, especially by incorporating them into food products, so as to give these products a pronounced cocoa taste.

The aim of the present invention is to respond to this need.

SUMMARY OF THE INVENTION

To this end, the subject of the present invention is a process for the preparation of caramelized cocoa nibs, in which:
— a mixture is prepared comprising at least 38–72% of cocoa nibs, 18–40% of sugar and 10–22% of water and/or milk,
— this mixture is treated at a high temperature, so as to obtain caramelized cocoa nibs,
— the caramelized cocoa nibs are tempered,
— and then they are heat treated.

A mixture is therefore prepared comprising at least cocoa nibs, sugar and water and/or milk.

The cocoa nibs may be obtained from cocoa beans which have been roasted or otherwise and then crushed or otherwise. The cocoa beans can be crushed into 1–10 mm nibs, for example.

The sugar may be sucrose or an invert sugar, such as glucose or fructose, and may be in crystalline form or in syrup form, for example.

The mixture comprises especially water and/or milk, so as to allow the solubilization of the sugar in the mixture. The milk may be fresh milk, powdered milk or concentrated milk, for example.

DETAILED DESCRIPTION OF THE INVENTION

In the rest of the description, the temperature values indicated represent "the mean temperatures of the mixture" or "the mean temperatures of the cocoa nibs".

The mixture may be treated at a high temperature at 90–120° C. for 15–35 min, so as to obtain caramelized cocoa nibs, for example. During this stage, part of the water and/or the milk is eliminated and the sugar, while caramelizing, adheres to the cocoa nibs.

The caramelized cocoa nibs may be tempered at 75–100° C. for 1–6 min, so as to allow the crystallization of the sugar, for example. During this stage, the excess water and/or milk is evaporated.

The caramelized cocoa nibs may then be heat treated at 110–150° C. for 1–10 min so as to complete the caramelization of the sugar at the surface of the cocoa nibs, for example.

Finally, the caramelized cocoa nibs may be cooled to room temperature after they have been heat treated, for example. They may, in particular, be cooled over a screen provided with a cooling system using a blower or aspiration of filtered air.

The present invention also relates to caramelized cocoa nibs which are coated with 10–80% sugar. These caramelized cocoa nibs are capable of being obtained using the present process.

Furthermore, the present invention relates to the use of these caramelized cocoa nibs in the manufacture of a food product, into which at least 1% caramelized cocoa nibs is incorporated during its preparation. They may be used in particular for the manufacture of biscuits, chocolate bars, ice cream cones, block ice cream or ice cream sticks.

EXAMPLES

The present invention is described in greater detail in the nonlimiting examples below. In these examples, the percentages are given by weight, unless otherwise indicated.

Example 1

A mixture comprising 24 kg of roasted cocoa nibs, 16 kg of sugar and 8 l of water is prepared in a pan.

This mixture is heat treated at 110° C. for 25 min, while mixing, so as to obtain a relatively homogeneous caramelization of the sugar at the surface of the cocoa nibs. The mixing is carried out at 20 rpm.

The caramelized cocoa nibs are then tempered at 110° C. for 2 min.

Next, they are heat treated at 140° C. for 3 min.

Finally, the caramelized cocoa nibs are cooled to room temperature. To do this, they are poured, outside the pan, over a screen provided with a cooling system using aspiration of filtered air.

The caramelized cocoa nibs thus prepared are then stored in cartons, until they are used.

Example 2

The caramelized cocoa nibs such as those obtained in Example 1 are used for the manufacture of an ice cream.

To do this, 92.3 g of powdered skimmed milk, 150 g of sucrose, 26.2 g of glucose syrup and 5 g of emulsifier are dissolved in 494 g of water at 65° C.

4 g of vanilla flavour and 228.5 g of cream containing 35% fat are added thereto.

This preparation is homogenized in a Rannie type homogenizer, marketed by Kindler Maschinen A. G., PO Box 297, CH-8021, Zurich, in two successive passes, the first at 140 bar and the second at 40 bar.

The homogenized preparation is pasteurized at 83° C. for 30 s in a plate exchanger.

It is cooled to 4° C. and it is allowed to stand for 12 h at this temperature before carrying out the glazing in a HOYER MF50 type freezer marketed by APV TECHNOHOY, Axel Kiers Vej 28–30, DK-8270 Aarhus-Hojbjerg.

Then 10% caramelized cocoa nibs are added to the ice cream thus obtained.

This ice cream is then hardened in a pulsed air cooling cell and it is stored at −35° C.

After tempering at −18° C., this ice cream has an unctuous texture and a vanilla taste mixed with a pronounced cocoa taste, because of the presence of the caramelized cocoa nibs.

Example 3

The caramelized cocoa nibs as obtained in Example 1 are used for the manufacture of a chocolate bar.

To do this, the shell is poured and then turned over so as to remove the excess chocolate. The shell may be composed of 10% cocoa paste, 26% powdered milk, 41.5% sugar, 22.3% cocoa butter, 0.19% emulsifier and 0.01% vanilla flavour, for example.

The shell thus turned over is placed in a cold room at 8° C. for 5 min, so as to slightly harden the chocolate in the shell of the bar.

Then on removing from the cold room, the shell is turned over and it is heated for 3 seconds using infrared radiation.

The filling cream, into which 10% caramelized cocoa nibs have been incorporated, is then deposited using injection nozzles. The filling cream may be composed of 40% roasted hazelnuts, 40% sugar, 8% cocoa paste, 7.5% cocoa butter, 4.2% powdered milk, 0.26% emulsifier and 0.04% flavouring, for example.

The whole is slightly tapped so as to properly distribute the filling cream at the base of the shell.

The whole is left in a cold room for 4 min at 4° C.

On leaving the cold room, the crust is poured so as to cover the whole of the surface of the bar. The crust may be composed of 10% cocoa paste, 26% powdered milk, 41.5% sugar, 22.3% cocoa butter, 0.19% emulsifier and 0.01% vanilla flavour, for example.

The filled chocolate bar thus prepared is placed in a cold chamber at 0° C. for 15 min before it is unmoulded.

A chocolate bar with a melting texture and a pronounced cocoa taste is thus obtained.

Example 4

The caramelized cocoa nibs as obtained in Example 1 are used for the manufacture of shortbreads.

To do this, 800 g of butter and 400 g of icing sugar are mixed.

150 g of egg white and 1200 g of flour are added to this preparation.

The dough thus prepared is kneaded.

350 g of caramelized cocoa nibs are then mixed with this dough.

The dough is rolled out and cut into discs 6 mm thick and 6 cm in diameter.

The discs thus prepared are baked in an oven at 200° C. for 10 min.

Shortbreads with a biscuit-like taste mixed with a pronounced cocoa taste because of the incorporation of the caramelized cocoa nibs are thus obtained.

What is claim is:

1. A process for the preparation of cocoa nibs coated with caramelized crystalline sugar and suitable for use in food products, which comprises:

preparing a mixture comprising at least 38–72% of roasted cocoa nibs, 18–40% of sugar and 10–22% of water, milk or a mixture of water and milk;

treating the mixture at a temperature effective to eliminate part of the water, milk, or mixture of water and milk and to have the sugar adhered to the surface of the nibs;

tempering the treated mixture by reducing the temperature to 75–100° C. for a time of 1–6 minutes to obtain crystallization of the sugar adhered to the surface of the nibs; and heat treating the tempered cocoa nibs at a temperature effective to caramelize the crystallized sugar coating the nibs to obtain cocoa nibs coated with the caramelized crystallized sugar.

2. The process according to claim 1, in which the mixture is treated at a temperature of 90–120° C. for a time of 15–35 minutes.

3. The process according to claim 1, in which the tempered mixture is heat treated at a temperature of 110–150° C. for a time of 1–10 minutes.

4. The process according to claim 1, in which the coated cocoa nibs are cooled to room temperature after they have been heat treated.

5. Cocoa nibs coated in caramelized sugar obtained from the process according to claim 1.

6. A food product containing the cocoa nibs of claim 5.

7. The food product according to claim 6, wherein the cocoa nibs are present in an amount of at least 1%.

8. The cocoa nibs according to claim 5, characterized in that they are coated with 10–80% sugar.

9. A food product containing the cocoa nibs of claim 8.

10. The food product according to claim 9, wherein the cocoa nibs are present in an amount of at least 1%.

11. A process for the preparation of cocoa nibs coated with caramelized crystalline sugar and suitable for use in food products, which comprises:

preparing a mixture comprising at least 38–72% of roasted cocoa nibs, 18–40% of sugar and 10–22% of water, milk or a mixture of water and milk;

treating the mixture at a temperature of 90–120° C. for a time of 15–35 minutes to eliminate part of the water, milk, or mixture of water and milk and to have the sugar adhered to the surface of the nibs;

tempering the treated mixture by reducing the temperature to 75–100° C. for a time of 1–6 minutes to obtain crystallization of the sugar adhered to the surface of the nibs; and heat treating the tempered cocoa nibs at a temperature effective to obtain caramelization of the sugar.

12. Cocoa nibs coated in caramelized sugar capable of being obtained from the process according to claim 11.

13. The cocoa nibs according to claim 12, characterized in that they are coated with 10–80% sugar.

14. A food product containing the cocoa nibs of claim 13.

15. The food product according to claim 14, wherein the cocoa nibs are present in an amount of at least 1%.

16. A food product containing the cocoa nibs of claim 12.

17. The food product according to claim 16, wherein the cocoa nibs are present in an amount of at least 1%.

* * * * *